US006354773B1

(12) United States Patent
Konen

(10) Patent No.: US 6,354,773 B1
(45) Date of Patent: Mar. 12, 2002

(54) WOOD BORING DRILL BIT

(75) Inventor: Bruce P. Konen, Aurora, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 09/627,893

(22) Filed: Jul. 27, 2000

(51) Int. Cl.[7] .......... B23B 51/02

(52) U.S. Cl. .......... 408/213; 408/214; 408/225; 408/227

(58) Field of Search .......... 408/201, 211, 408/213, 214, 225, 227, 228, 229, 230

(56) References Cited

U.S. PATENT DOCUMENTS

| | | | | | |
|---|---|---|---|---|---|
| 2,883,888 | A | * | 4/1959 | Stewart | 408/214 |
| 3,165,131 | A | * | 1/1965 | Mackey | 408/201 |
| 3,687,565 | A | | 8/1972 | Byers et al. | |
| 3,748,052 | A | | 7/1973 | Jensen | |
| 3,945,753 | A | | 3/1976 | Byers et al. | |
| RE28,900 | E | | 7/1976 | Byers et al. | |
| 4,012,970 | A | * | 3/1977 | Hintz et al. | 408/213 |
| 4,134,706 | A | | 1/1979 | Stewart | |
| 4,225,274 | A | * | 9/1980 | Katz | 408/225 |
| 4,239,427 | A | * | 12/1980 | Walton, II | 408/214 |
| 4,244,667 | A | * | 1/1981 | Timmons | 408/214 |
| 4,286,904 | A | | 9/1981 | Porter et al. | |
| 4,682,917 | A | | 7/1987 | Williams, III et al. | |
| 4,950,111 | A | | 8/1990 | Thomas | |
| 5,193,951 | A | | 3/1993 | Schimke | |
| 5,221,166 | A | | 6/1993 | Bothum | |
| 5,286,143 | A | | 2/1994 | Schimke | |
| 5,310,294 | A | | 5/1994 | Perkins | |
| 5,433,561 | A | | 7/1995 | Schimke | |
| 5,697,738 | A | | 12/1997 | Stone et al. | |
| 5,700,113 | A | | 12/1997 | Stone et al. | |

* cited by examiner

*Primary Examiner*—Daniel W. Howell
(74) *Attorney, Agent, or Firm*—Cook, Alex, McFarron, Manzo, Cummings & Mehler, Ltd.

(57) ABSTRACT

A wood boring drill bit assembly includes a cast cutting head body having a front cutting portion, a rear connecting portion and a central longitudinal axis extending from the front portion to the rear portion. A stem extends axially rearward from the rear connecting portion. A pair of helically-shaped wings extend from the front cutting portion in opposed radial directions along the longitudinal axis. Each wing has an axially forward surface, a side surface, a trailing surface, and a machined cutting edge. The cutting head body has a tapered surface extending from the side surface of each wing to the rear connecting portion near the stem to allow for smooth retraction of the cutting head body from a drilled hole.

10 Claims, 2 Drawing Sheets

WOOD BORING DRILL BIT

FIELD OF THE INVENTION

The present invention relates generally to a wood boring drill bit and more particularly to a wood boring drill bit having an easily retractable cutting head with helical-shaped cutting wings and a self-feeding pilot screw.

BACKGROUND OF THE INVENTION

Flat one piece wood boring drill bits, commonly known as spade drill bits, are widely used for boring holes in wood. However, spade drill bits are generally thin and effective only for occasional or light duty drilling. A heavier and more substantial cutting head is needed and desirable for drilling large diameter holes. Also a heavier cutting head is needed for drilling a large number of holes or for drilling holes through thick material or hard wood or composite materials.

Contractors and professional builders prefer heavy duty wood-boring bits with a helical-shaped cutting head and a self-feeding pilot screw. A sturdy helical cutting head performs better than a flat spade bit because the helical cutting head cuts faster and requires little axial force. Also, these heavier drill bits generally have a pilot screw with tapered threads to pull the cutting head into the wood. However, these heavier cutting heads have certain disadvantages.

One disadvantage of presently known helical cutting heads is that the cutting heads have a square profile. The squared trailing surfaces of the cutting head often hang up or snag on the exit end of the drilled hole when the cutting head is being retracted through the hole.

Another disadvantage of known cutting heads is that the pilot screw can be dulled or damaged through use or when the drill bit encounters hard material. It is often difficult to sharpen or repair the pilot screw. If the pilot screw is permanently attached to the cutting head and shank, the whole drill bit may have to be replaced. If the pilot screw is permanently attached to only the cutting head, the cutting head and pilot screw may have to be replaced. If the pilot screw is a permanent part of the shank, the pilot screw and shank portion may have to be replaced.

Another disadvantage of known cutting heads is that the cutting heads are permanently attached to a fixed length shank. A cutting head that is permanently attached to a shank does not allow the drill user any flexibility in configuring the drill bit assembly for the specific drilling situation. Therefore, the present invention provides a self-feeding, wood boring drill bit which overcomes many of the problems of known cutting heads.

SUMMARY OF THE INVENTION

The present invention provides a smoothly tapering trailing surface on the cutting head that tapers from the side surfaces of the wings to a point near the shank. The tapered trailing surface allows smooth retraction of the cutting head from a drilled hole.

The present invention also provides a replaceable pilot screw as part of the cutting head. The cutting head has an axial bore for receiving a replaceable pilot screw and a set screw for locking the pilot screw in place.

The present invention also provides a short stem on the rear of the cutting head for receiving a separate shank. The stem allows the user to configure the drill bit for the specific situation.

DETAILED DESCRIPTION OF THE INVENTION

Figures 1, 2, 3, 4, 5:
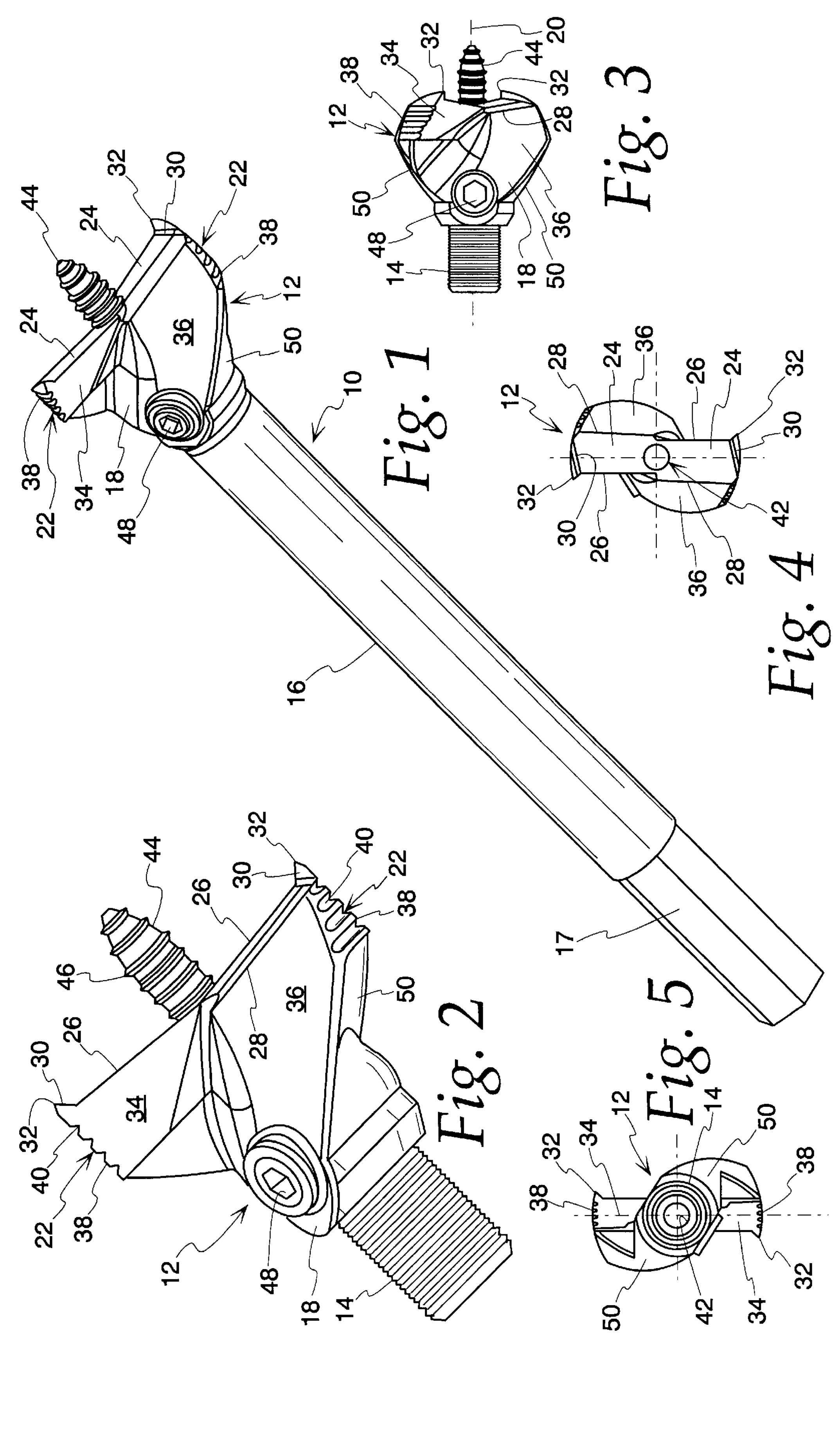
FIG. 1 is a perspective view of a drill bit assembly according to the present invention with a shank extension member attached to the cutting head.
FIG. 2 is an enlarged perspective view of the cutting head.
FIG. 3 is a side elevation view of the cutting head.
FIG. 4 is a front end elevation view of the cutting head.
FIG. 5 is a rear end elevation view of the cutting head.

FIGS. 1 and 2 illustrate the wood boring drill bit assembly 10 of the present invention. The drill bit assembly includes a cutting head 12 and a drive member. In the embodiment shown the drive member includes a threaded stem 14 integrally formed in the cutting head and an elongated shank 16. The shank has an axial bore at one end, with internal threads formed on the walls of the bore. The stem 14 fits into the axial bore at the end of the shank 16. The stem 14 has male threads, for example, connecting to the internal female threads in the bore. The other end of the shank 16 is insertable into the chuck of a drill, which rotates the shank 16, stem 14 and cutting head 12. Alternatively, the stem 14 could have other known connecting means, such as internal female threads or a hexagonal cross-section, to provide connection to like connecting means on the shank or directly to the drill. The shank 16 may also include a drive end 17 having a typical hexagonal cross section. The drive end is adapted to fit into the chuck of a drill, for example. The shank may be straight shank of various lengths or a flexible shank. Other forms of drive member are possible. For example, where length is not a concern, the stem 14 could be made hexagonal or otherwise arranged so it fits directly into the chuck of a drill. In this instance a shank would not be used.

Details of the cutting head will now be described in conjunction with FIGS. 2–5. The cutting head 12 has a cast metal body 18 which defines a central longitudinal axis 20 (FIG. 3). The stem 14 extends from the rear end of the body 18. First and second wings 22 extend radially outwardly from the central axis of the body 18. In this embodiment each wing is helically-shaped and extends in an opposed radial direction to the other wing. The helical wings of the cutting head define only a small portion of a complete helix, for example an arc of approximately 45 degrees. Each wing 22 has a generally forward facing land 24 bounded by a leading cutting edge 26 and a trailing edge 28. The land 24 has an upwardly angled portion 30 at its outer diameter which terminates at a cutting point 32. The leading cutting edge 26 extends generally inward toward the rotational axis 20 from the cutting point 32. The wings 22 further define leading and trailing surfaces 34 and 36 which are joined by a side surface 38. The side surface may have grooves as at 40 (FIG. 2). The land 24 and leading surface 34 may be machined into the cast body 18, as by grinding or the like.

The cutting head 12 also includes an axial bore 42 (FIGS. 4 and 5) at the junction of the lands 24. A pilot screw 44 having a tapering thread 46 is axially positioned in the bore so that the pilot screw extends axially forward beyond the cutting points 32 and the cutting edge 26. The cutting head also includes a set screw 48, for example, to secure the pilot screw 44 in the axial bore 42 of the cutting head. A threaded set screw hole extends radially from the outside of the cutting head body 18 into the central axial bore so that the set screw can lock the pilot screw 44 into cutting head. The removable set screw 48 allows a worn or damaged pilot screw 44 to be removed from the cutting head and replaced. Replacing the pilot screw is desirable since it is often only the pilot screw which is damaged or worn in drilling.

The base or rear edge of the side surfaces 38 of each wing joins a tapered surface 50 of the cutting head body 18. The tapered surfaces extend from the wings to a location near the stem 14. The tapered surface is approximately 45 degrees relative to the longitudinal axis 20. The tapered surfaces 50 facilitate the withdrawal of the cutting head from a drilled hole without the head hanging up on the edge of the hole.

When drilling begins, the pilot screw 44 enters the wood and pulls the cutting head toward the wood. Next the two cutting points 32 begin cutting the wood at the outer periphery of the drill hole. Finally the two cutting edges 26 begin cutting into the top layers of wood, shaving small chips of wood which pass upward onto the land 24 of the wings and out the hole.

Figure 7A:
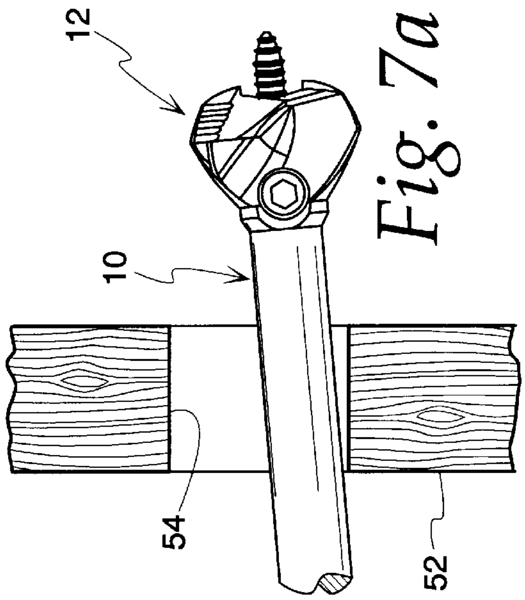
FIGS. 7A and 7B show the drill bit of the present invention being retracted through a drilled hole.
Figure 7B:
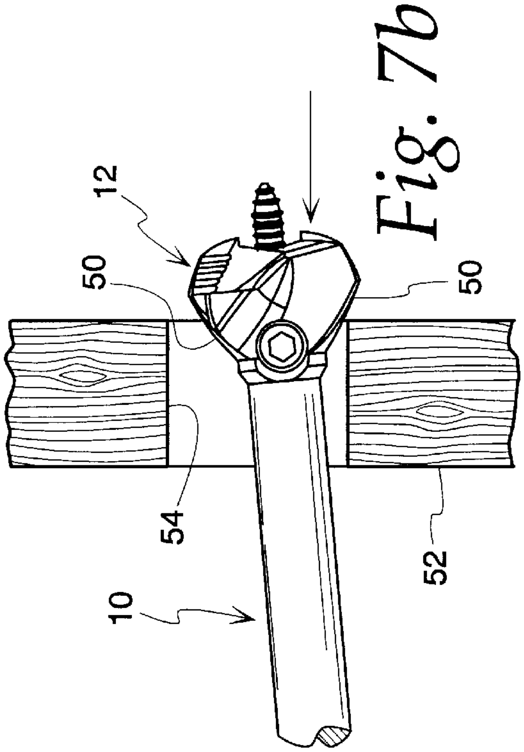
Figure 6A:
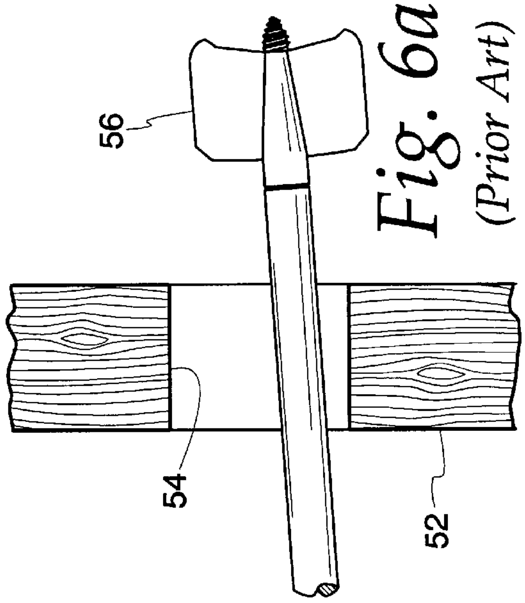
Fig. 6a (Prior Art)
FIGS. 6A and 6B show a prior art drill bit being retracted through a drilled hole.
Figure 6B:
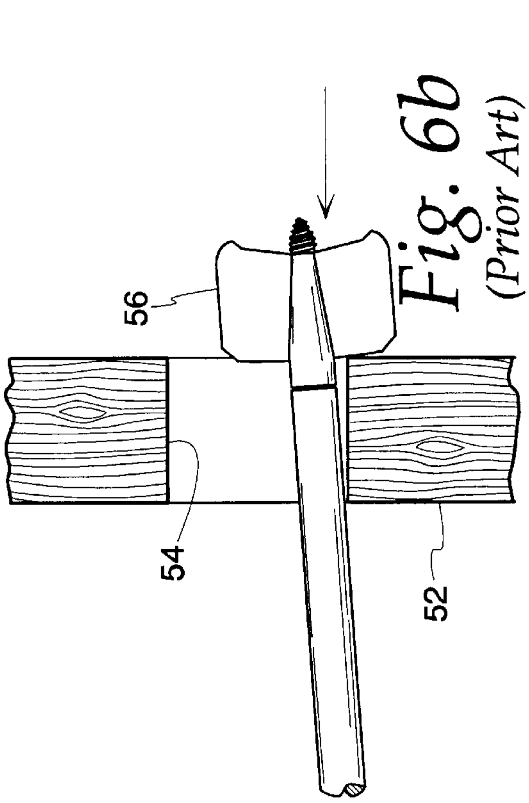
Fig. 6b (Prior Art)

As shown in FIG. 7B, once the cutting head 12 of the present invention has broken through the rear surface of the work piece 52, the cutting head can be retracted through the drilled hole 54 without hanging up on the edges of the hole. The tapered surfaces 50 under the wings allow the cutting head to slide smoothly past the edge of the hole. The tapered trailing surface of the present invention is contrasted with the square-shaped cutting head of the known drill bit 56 shown in FIGS. 6A and 6B, which tends to hang up on the edge of the drilled hole when being retracted.

The construction of the cutting head of the present invention provides certain advantages. The cutting head body 12 is cast as a single metal piece, including the external threads on the stem 14. The center axial bore and set screw threads can be readily machined in the body. The land 24 including the cutting points 32 and leading cutting edges 26 can also be machined onto the cutting head body. The pilot screw 44 and set screw 48 can be provided by a separate manufacturing step. To complete the assembly, the pilot screw is inserted into the axial bore 42 and the set screw locks the pilot screw into the cutting head. This two-part construction allows for simple manufacture of the cutting head assembly as well as allowing for later replacement of the pilot screw should the pilot screw be damaged or worn.

The shank 16 is provided as a separate part. The shank extension is threaded onto the stem 14 on the cutting head. This allows the user to choose a specific length of shank or a flexible shank for drilling curved holes.

Thus the present invention achieves the advantage of a simple and economic construction of the cutting head assembly, the ability to replace parts that are worn or damaged and the flexibility in configuring the length and type of shank. The tapered surface of the cutting head body 12 allows for smoother retraction of the cutting head after a hole has been drilled.

While a preferred form of the invention has been shown and described, it will be realized that alterations and modifications may be made thereto without departing from the scope of the following claims.

What is claimed is:

1. A wood boring drill bit assembly comprising a drive member, a cutting head body connected to one end of the drive member, the drive member and cutting head body defining a central longitudinal axis, the cutting head body having first and second wings, each wing having a land extending in opposed radial directions from the longitudinal axis and terminating at side surfaces, each wing further including leading and trailing surfaces extending in a helical manner from the land to the drive member, the cutting head body further including tapered surfaces extending from the side surface of each wing to the drive member at a helix angle relative to the longitudinal axis.

2. The wood boring drill bit of claim 1 wherein the tapered surfaces tapers at approximately a 45 degree helix angle relative to the central longitudinal axis.

3. The wood boring drill bit of claim 1 wherein the drive member further comprises a stem connected to the cutting head and a shank connected to the stem.

4. The wood boring drill bit of claim 1 wherein the land defines a cutting edge and further comprising an axial bore in the cutting head body and a pilot screw fixed axially in the bore so as to extend forward beyond the cutting edges of the wings.

5. The wood boring bit of claim 1 wherein the land defines a cutting edge.

6. The wood boring drill bit of claim 5 wherein the land also includes a cutting point on the outer radial periphery of the land and the cutting edge extends generally radially inward from the cutting point.

7. The wood boring drill bit of claim 6 wherein the cutting head body is a cast metal body and the land, cutting edge and cutting point are carried by the cast metal body.

8. The wood boring drill bit of claim 1 wherein the wings extend radially from the axis a distance that is greater than the diameter of the drive means.

9. The wood boring drill bit of claim 4 further comprising means for securing the pilot screw in the axial bore.

10. The wood boring drill bit of claim 9 wherein the securing means is a set screw threaded radially through the cutting head body to engage the pilot screw in the axial bore.

* * * * *